United States Patent [19]
Fritze

[11] 3,988,650
[45] Oct. 26, 1976

[54] ALUMINUM-ELECTROLYTIC CAPACITOR HAVING A LOW IMPEDANCE AND LOW INDUCTANCE

[75] Inventor: Franz Fritze, Heidenheim-Schnaitheim, Germany

[73] Assignee: Siemens Aktiengesellschaft, Berlin & Munich, Germany

[22] Filed: Jan. 30, 1975

[21] Appl. No.: 545,541

[30] Foreign Application Priority Data
Feb. 8, 1974    Germany............................ 2406141

[52] U.S. Cl. ............................ 317/230; 317/242; 29/570
[51] Int. Cl.² ...................... H01G 9/00; H01G 9/16; B01J 17/00
[58] Field of Search ............... 317/230, 242; 29/570

[56] References Cited
UNITED STATES PATENTS
3,010,056   11/1961   Kurland .............................. 317/230
3,806,770   4/1974    Voyles et al. ....................... 317/230

FOREIGN PATENTS OR APPLICATIONS
153,041   1/1952   Australia............................. 317/230

*Primary Examiner*—Andrew J. James
*Attorney, Agent, or Firm*—Hill, Gross, Simpson, Van Santen, Steadman, Chiara & Simpson

[57] ABSTRACT
An aluminum-electrolytic capacitor having a low impedance and a low inductance for use in filter circuits and having wound anode and cathode foil layers separated by intermediate paper layers saturated wth operating electrolyte.

10 Claims, 5 Drawing Figures

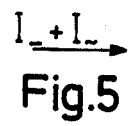
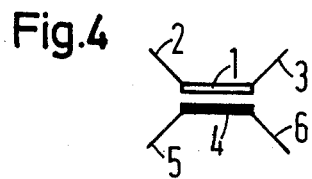
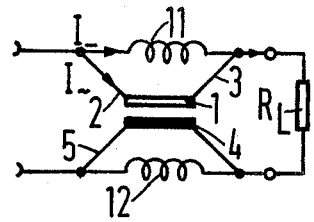
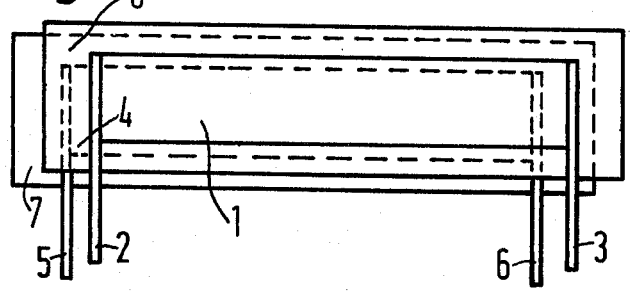
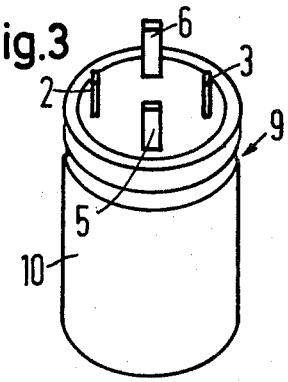
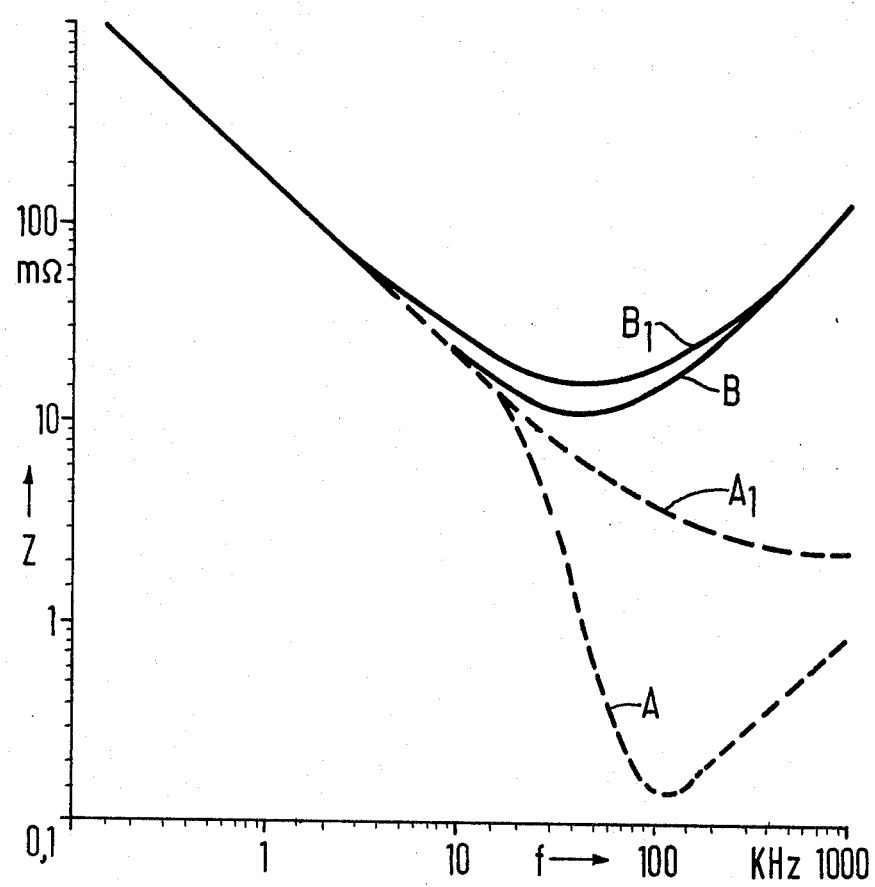

ALUMINUM-ELECTROLYTIC CAPACITOR HAVING A LOW IMPEDANCE AND LOW INDUCTANCE

This invention relates to aluminum-electrolytic capacitors having a low impedance and a low inductance for use in filter circuits and in particular in d.c. voltage converters, and in which the capacitor comprises wound anode and cathode foil layers which are separated from each other by intermediate paper layers saturated with the operating electrolyte.

When electrolytic capacitors are employed in main-fed rectifiers the inductive component of the impedance is without significance. Recently so-called DC-DC converters with the aid of which a d.c. voltage of a given value can be transformed into a different one have become increasingly important. For this purpose the primary voltage is periodically connected to the input winding of a transformer; the secondary voltage is rectified and smoothed before it is conducted to a consumer. The converter frequency is generally above the audio-frequency and is e.g. greater than 20 kHz. At these frequencies the impedance and natural inductance of the electrolytic capacitors have already risen considerably.

Accordingly, it becomes desirable to provide an electrolytic capacitor which at the normal frequencies in DC-DC converters has a low impedance and a lower inductance than conventional electrolytic capacitors.

SUMMARY OF THE INVENTION

It is an object of the present invention to provide an electrolytic capacitor which at frequencies normally encountered in DC-DC converters has a low impedance and a lower inductance than conventional electrolytic capacitors.

Another object is to provide an electrolytic capacitor having anode and cathode foil layers wherein the effectiveness of the capacitor is increased by positioning a current tap at each end of each of the foils.

Another object is to provide an electrolytic capacitor of the type embodying the invention herein with a choke arrangement which is effective to prevent overheating of the capacitor.

Other objects and advantages of the invention will become more apparent when considering the following description and accompanying drawings.

DESCRIPTION OF THE DRAWINGS

FIG. 1 is a schematic showing of anode and cathode foil sections of an electrolytic capacitor embodying the invention herein;

FIG. 2 is a curve illustrating the variation of impedance with the applied frequency in electrolytic capacitors of different constructions;

FIG. 3 is a perspective view of an electrolytic capacitor embodying the invention herein and showing the positioning of the terminals connected to the anode and cathode;

FIG. 4 is a diagrammatic showing of contact layout in a capacitor embodying the invention herein;

FIG. 5 is a diagrammatic showing of the capacitor embodying the invention herein including choke coils in parallel with the anode and cathode foils of the capacitor.

DESCRIPTION OF PREFERRED EMBODIMENT

The aim of the invention is accomplished by providing each metallic coating with two taps which for the feed-in and withdrawal of the current are arranged in spaced relationship and separately extracted, and which form an effective RC lattice network.

The explanation for the considerably more favorable impedance of an electrolytic capacitor constructed in this way lies in the fact that the foil resistances, in conjunction with the very high surface capacitances in electrolytic capacitors provide an lattice network formed of RC elements. The effectiveness increases in accordance with the increase in spacing between the taps on the metallic coatings. It is the greatest when the taps are placed at the ends of the coatings.

A fundamental advantage of the capacitor described herein and made in accordance with the invention is that these lattice network properties remain effective even at low temperatures.

From the interference suppression technique wound capacitors with four pole contacts are known whose foils have contacts at the beginning and the end. These known capacitors are used as LC filter chains. In order to increase the inductance their windings are wound, for example, on cores of magnetic material.

FIG. 1 schematically illustrates the construction of the electrolytic capacitor of the invention. The anode foil 1 has formed thereon at each end two coating taps 2 and 3. The cathode foil 4 is likewise provided at each end with two coating taps 5 and 6. The two foils are wound with interposed paper layers 7 and 8, said paper layers 7 and 8 being saturated with the operating electrolyte.

In one embodiment of the invention an aluminum-low-voltage electrolytic capacitor (1000 uF/100 V) was produced from anode and cathode foils having contacts formed at each end thereof. For comparison, the same capacitor was provided with contacts in the conventional manner, i.e., one contact in the middle of each of the foils.

FIG. 2 illustrates how the impedance Z varies depending upon the applied frequency f. The solid curve (B) reflects the situation in which the capacitor has contacts positioned in the conventional manner in an environmental temperature of 25° C. The broken-line curve (A) reflects the situation in which the capacitor has four contact poles. It will be seen from FIG. 2 that the impedance is at a minimum when the frequency is approximately 150 kHz, and in the electrolytic capacitor having the four contact poles the minimum of the impedance is two degrees lower than in the normally contacted capacitor. Curves $A_1$ and $B_1$ which were based on the capacitors having four contact poles and two contact poles respectively at an environmental temperature of 0° show that the capacitor in accordance with the invention even at 0° C. is clearly superior to the conventional capacitor at 25° C.

Since, as is known, the inductance in windings of bifilar design is practically formed only by the connection lines, capacitors with four pole contacts possess a minimum inductance in comparison to those with two pole contacts. Curve A in FIG. 2 clearly shows the advantage at two levels. The position of the impedance minimum is basically dependent upon the geometry of the capacitor and the surface capacitance of the anode.

It is possible to have the two pairs of terminals from one end of the capacitor. This is preferable for reasons of cost.

In accordance with a further development of the invention, when the terminals protrude from one side, the pairs of terminals belonging to the output and input are displaced by 90° in relation to one another, the terminals of a pair being diametrally arranged in relation to one another. One thus achieves an extremely low inductive coupling of input and output circuit.

FIG. 3 illustrates a finished electrolytic capacitor with four terminals 2, 5 and 3, 6 all disposed at one end, said capacitor being installed in a container 10. As can be seen from FIG. 3, the outer and inner wiring are effected in such manner that the pair of terminals 2, 5 belonging to the input is displaced 90° in relation to the pair 3, 6 belonging to the output. Thus the circuits, and consequently the magnetic fields, are at right angles to one another, as a result of which the mutual magnetic influence assumes the lowest possible value.

When the electrolytic capacitor in accordance with the invention is operated with a winding and contact layout as shown in FIG. 4, there is a danger that the capacitor will become undesirably heated under the influence of the effective current (direct current). This is due to the fact that the consumer current flows through not only all four terminal strips but also the coating foils along their full length. Therefore, in the case of consumer currents, e.g., of more than 4A and foil track resistances resulting from having a capacitor with a diameter of e.g. 35 mm, d.c. power can lead to an impermisibly high temperature rise.

These difficulties can be avoided by using the capacitor made in accordance with the invention together with chokes or inductors, each choke being connected in parallel to the anode and cathode foil. Such a circuit is illustrated in FIG. 5, in which the choke 11 is connected in parallel to the anode foil 1 and the choke 12 in parallel to the cathode foil 4. The choke must be dimensioned in such manner that its d.c. resistance is low in comparison to the foil resistance whereas its a.c. resistance must be substantially greater than the input resistance at the input terminals of the capacitor; then the d.c. component of the current flows principally via the chokes 11, 12 so that the heating of the capacitor is brought about practically only by the a.c. power.

While a preferred embodiment of the invention has been disclosed, it will be appreciated that this has been shown by way of example only, and the invention is not to be limited thereto as other variations will be apparent to those skilled in the art and the invention is to be given its fullest possible interpretation within the terms of the following claims.

What is claimed is:

1. An aluminum-electrolytic capacitor having a low impedance and a low inductance for use in filter circuits comprising:
    a winding of anode and cathode foil layers;
    an intermediate paper layer saturated with the operating electrolyte disposed between said anode and cathode foil layers;
    a pair of taps disposed on each of said anode and cathode foil layers for input and output of current; said pair of taps on each layer being disposed in spaced relation and forming an effective RC lattice network.

2. The aluminum-electrolytic capacitor of claim 1 wherein
    the pair of taps on each foil layer are disposed at the ends of the foil.

3. The aluminum-electrolytic capacitor of claim 1 wherein
    the pair of taps on each foil are disposed at the ends of the foil and extend transversely to the plane of winding of said foil layers.

4. The aluminum-electrolytic capacitor of claim 1 wherein
    the input taps and output taps protruding from the end of the wound capacitor are circumferentially displaced 90° from each other.

5. The aluminum-electrolytic capacitor of claim 4 including first choke means connected in parallel with the anode; and second choke means connected in parallel with the cathode.

6. The aluminum-electrolytic capacitor of claim 5 wherein said choke means comprises inductor coils.

7. The aluminum-electrolytic capacitor of claim 4 including
    choke means connected in parallel with said anode and cathode foils and wherein the d.c. resistance of said choke means is low in comparison to the resistance of said foils and the impedance of said choke means at the operating frequency of said capacitor greater than the input resistance of said four pole capacitor.

8. The aluminum-electrolytic capacitor of claim 1 wherein
    the input and output taps on each foil layer are disposed at the ends of said foil layer and in the wound capacitor protrude from the end of the capacitor circumferentially displaced 90° from each other.

9. The aluminum-electrolytic capacitor of claim 8 including choke means connected in parallel with said anode and cathode.

10. The aluminum-electrolytic capacitor of claim 1 including
    inductor choke coils connected in parallel with each of said anode and cathode foil layers, said inductor choke coils having a d.c. resistance which is low in comparison to the resistance of said foil layers and an impedance which at the operating frequency is greater than the resistance of the four pole capacitor.

* * * * *